(12) United States Patent
Kitamura et al.

(10) Patent No.: US 8,178,815 B2
(45) Date of Patent: May 15, 2012

(54) MOLDING DIE MACHINING ELECTRODE, FABRICATING METHOD OF MOLDING DIE, AND MOLDING DIE

(75) Inventors: Kazumasa Kitamura, Ichinomiya (JP); Tomoki Nagae, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 734 days.

(21) Appl. No.: 12/233,843

(22) Filed: Sep. 19, 2008

(65) Prior Publication Data

US 2009/0081325 A1 Mar. 26, 2009

(30) Foreign Application Priority Data

Sep. 20, 2007 (JP) ................................. 2007-244063

(51) Int. Cl.
  B23H 1/04 (2006.01)
  B23H 9/00 (2006.01)
(52) U.S. Cl. .................................................... 219/69.15
(58) Field of Classification Search ............... 219/69.15; 264/219; 425/461
  See application file for complete search history.

(56) References Cited

U.S. PATENT DOCUMENTS

| 6,448,530 B1 * | 9/2002 | Fujita et al. ................ 219/69.17 |
| 6,991,450 B1 * | 1/2006 | Stephens, II .................. 425/461 |
| 2003/0064126 A1 * | 4/2003 | Miyazaki et al. ............. 425/461 |
| 2008/0017520 A1 * | 1/2008 | Koishikura et al. ........... 205/640 |
| 2009/0028981 A1 * | 1/2009 | Asaoka ........................ 425/461 |

FOREIGN PATENT DOCUMENTS

| JP | 2000-024840 A1 | 1/2000 |
| JP | 2001-071216 A1 | 3/2001 |
| JP | 2002-172527 A1 | 6/2002 |
| JP | 2002-239844 A1 | 8/2002 |

* cited by examiner

*Primary Examiner* — Maria Veronica Ewald
*Assistant Examiner* — Robert J Grun
(74) *Attorney, Agent, or Firm* — Burr & Brown

(57) ABSTRACT

In a molding die machining electrode, slit grooves of a molding die are machined with a slit groove forming part having a substantially circular outer circumference by arranging hexagonal erected wall parts in a row; while the inner circumference of a slit groove forming part overlaps with the erected wall parts in the outer circumference of the slit groove forming part, the outside slit grooves are machined with the slit groove forming part having a substantially circular outer circumference. The further outside slit grooves are machined with the slit groove forming part of the third electrode. A plurality of the slit groove forming parts are radially divided and overlapping portions between the plurality of the slit groove forming parts are formed substantially coaxially with a molded body. The areas of the slit groove forming parts are designed to nearly similar values, suppressing the difference in wear of the electrodes.

6 Claims, 4 Drawing Sheets

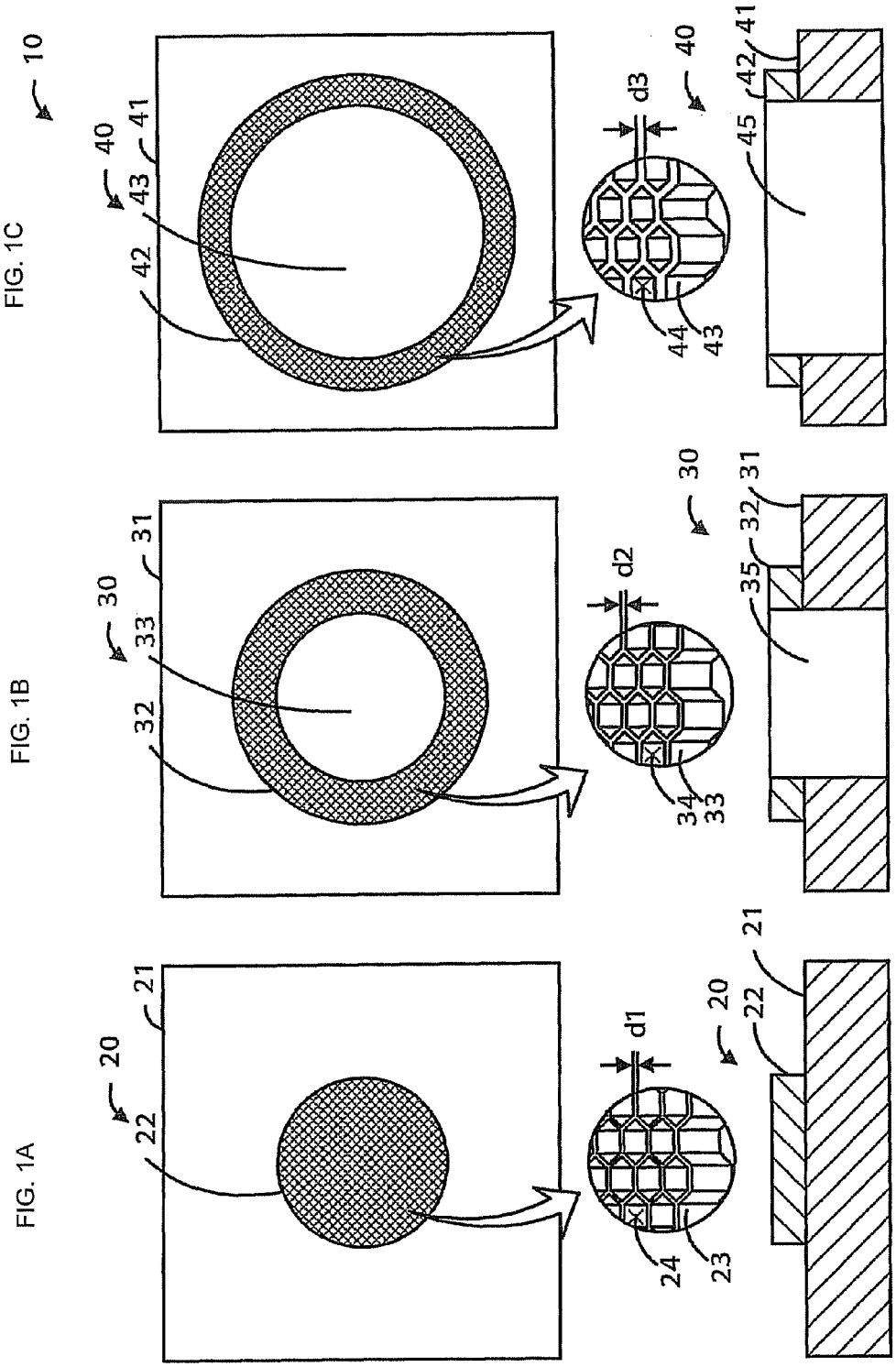

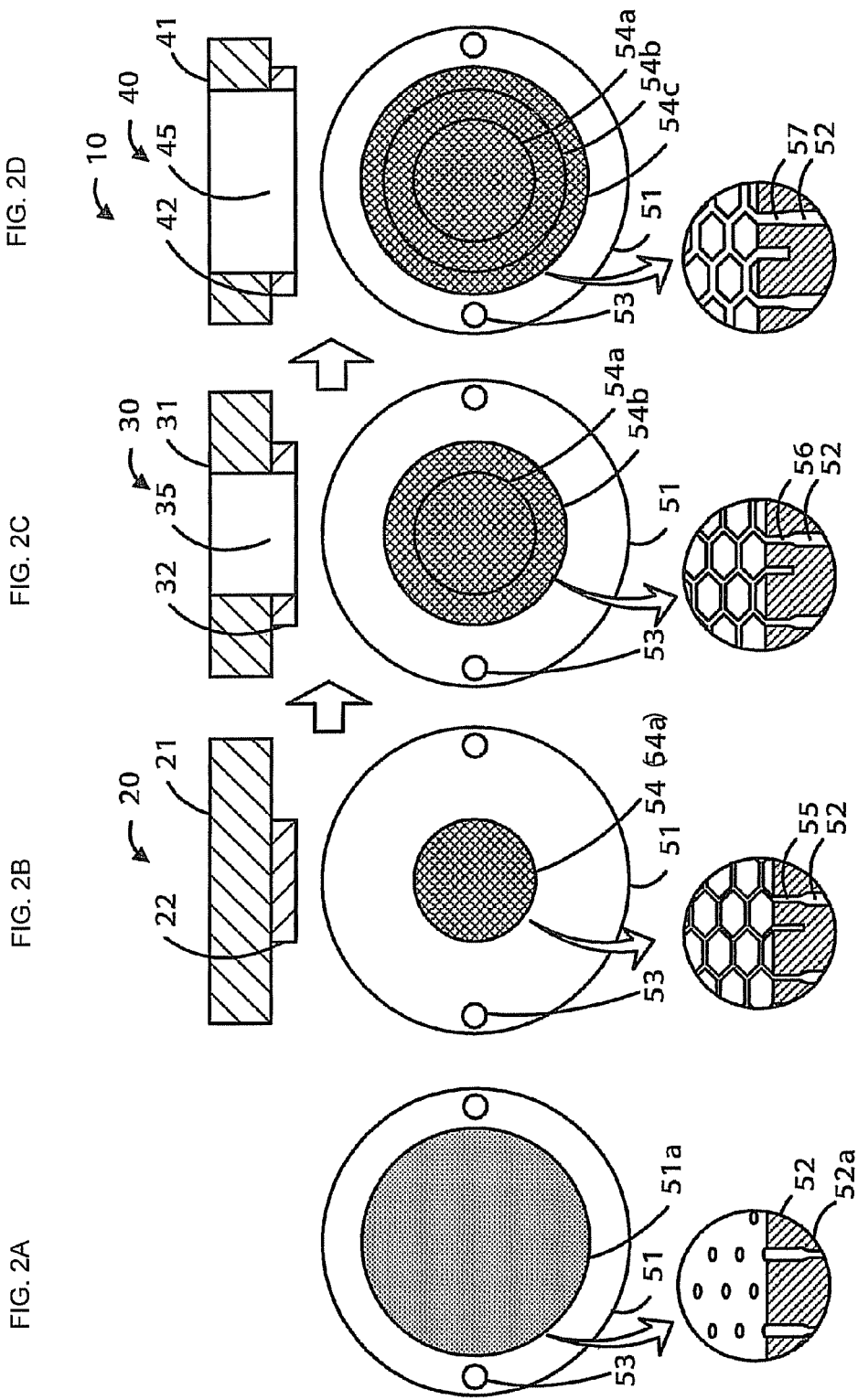

FIG. 3A
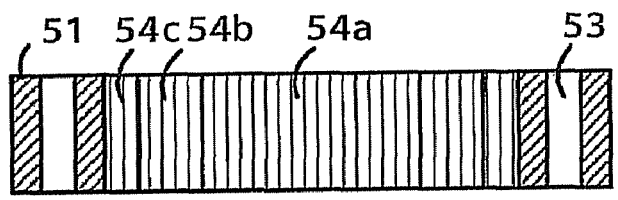
FIG. 3B
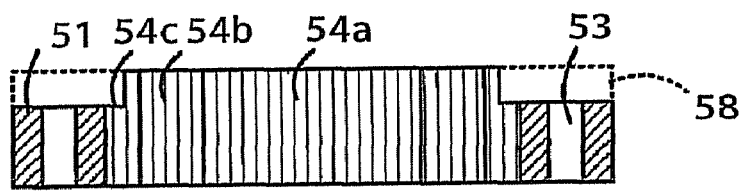
FIG. 3C
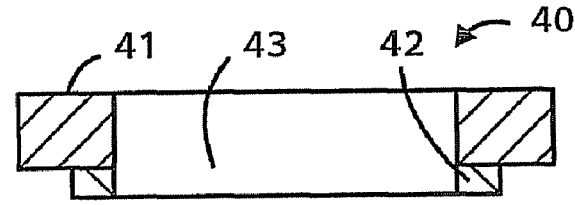
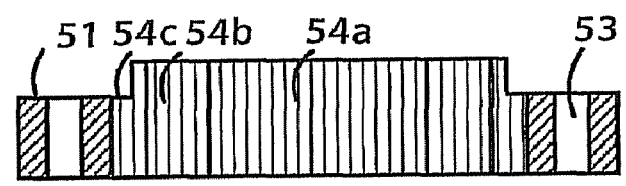
FIG. 3D
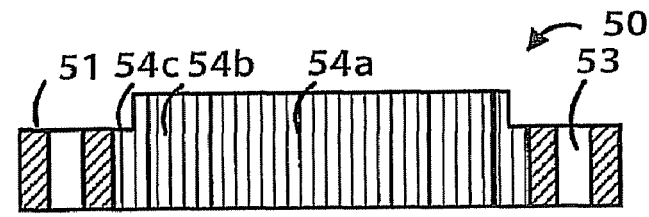

MOLDING DIE MACHINING ELECTRODE, FABRICATING METHOD OF MOLDING DIE, AND MOLDING DIE

BACKGROUND OF THE INVENTION

1. Field of the Invention

The present invention relates to a molding die machining electrode, a fabricating method of a molding die, and the molding die.

2. Description of the Related Art

A molding die machining electrode has been proposed in that a plurality of hexagonal-columnar tubular bodies, each having a through-hole, are attached on a plate retainer arranged at one ends of the tubular bodies so as to have a predetermined space between them, and while the electrode is being moved by a predetermined distance in a direction perpendicular to the axes of the tubular bodies, pottery body forming grooves of an extrusion die are machined by electric discharging at several times so as to facilitate the fabrication of the molding die machining electrode as well as to reduce the fabrication period of time (see Japanese Unexamined Patent Application Publication No. 2001-71216, for example).

SUMMARY OF THE INVENTION

However, in the molding die machining electrode described in Japanese Unexamined Patent Application Publication No. 2001-71216, the molding die is not integrally fabricated but is processed in several stages, so that the molding die machining electrode can be easily fabricated; however, the extrusion die grooves are processed by overlapping the grooves processed with the linearly arranged hexagonal-columnar tubular bodies by the electric discharging in several stages. Since the tubular bodies are linearly arranged, the overlapped grooves are also processed linearly or in a grid-like manner. Since the width of the groove processed by overlapping is increased in comparison with the grooves otherwise processed, linearly or grid-like broad grooves may exist in the extrusion die. If a columnar molded body, for example, is molded using such an extrusion die, the molding material may be non-uniformly extruded so as to generate formed curvature.

The present invention has been made in view of such problems, and it is an object of the present invention to provide a molding die machining electrode, a fabricating method of a molding die, and the molding die capable of more suppressing formed curvature of a molded body when the molded body is formed using the fabricated molding die as well as capable of being easily fabricated.

In order to achieve the object described above, the present invention has adopted the following means.

According to one aspect, the present invention is directed to a molding die machining electrode for fabricating a molding die that molds a molded body with a substantially circular outer circumference by extruding a molding material through slit grooves, the molding die machining electrode including a first forming member (i.e., machining electrode) having polygonal erected wall parts with a substantially circular outer circumference for machining the slit grooves; and a second forming member (i.e., machining electrode) formed coaxially with the first forming member and having polygonal erected wall parts with a substantially circular outer circumference for machining the slit grooves and a substantially circular inner circumference overlapping with the slit grooves machined with the outer circumference of the erected wall parts of the first forming member.

In the molding die machining electrode, the slit grooves of the molding die are machined with the first forming member having a substantially circular outer circumference of the hexagonal erected wall parts; while the second forming member formed coaxially with the first forming member and having polygonal erected wall parts with a substantially circular inner circumference for machining the slit grooves overlaps with the slit grooves formed by the erected wall parts in the outer circumference of the first forming member, the outside slit grooves formed by the first forming member are machined with the second forming member having a substantially circular outer circumference. In such a manner, since a plurality of the forming members are radially divided, the electrode can be more easily fabricated in comparison with the fabrication of an integral electrode. Also, since overlapping portions between the plurality of the forming members are formed substantially coaxially with a molded body, when the molded body is formed with the fabricated molding die, the formed curvature of the molded body can be further suppressed in comparison with a case where the overlapping portions between a plurality of the forming members are formed in a rectangular lattice pattern or a linear shape. Herein, "overlaps with the slit grooves formed by the erected wall parts in the outer circumference of the first forming member" means that during fabricating the molding die, the slit grooves machined with the erected wall parts in the outer circumference of the first forming member overlap with the slit grooves machined with the erected wall parts in the inner circumference of the second forming member. The phrase "substantially circular" includes a perfect circle, a nearly circular contour, and an ellipse. In addition, the molding die machining electrode may include the two or more forming members.

In the molding die machining electrode according to the present invention, preferably, the first forming member is formed to have a substantially circular outer circumference by arranging the polygonal erected wall parts in a row (i.e., contiguous pattern), and by arranging the polygonal erected wall parts in a row (i.e., contiguous pattern), the second forming member is formed to have a substantially circular shape such that the inner circumference of the erected wall parts of the second forming member overlaps with the slit grooves machined with the outer circumference of the erected wall parts of the first forming member while the second forming member being formed to have a substantially circular outer circumference by arranging the polygonal erected wall parts in a row.

In the molding die machining electrode according to the present invention, preferably, the first forming member and the second forming member are formed such that the end-face area of the erected wall parts of the first forming member is closer to that of the erected wall parts of the second forming member.

In the molding die machining electrode according to the present invention, preferably, the thickness of the polygonal erected wall part of the second forming member is different from that of the erected wall part of the first forming member. At this time, in the second forming member, the thickness of the polygonal erected wall part may be larger than that of the first forming member. Alternatively, in the second forming member, the thickness of the polygonal erected wall part may be smaller than that of the first forming member.

In the molding die machining electrode according to the present invention, preferably, the first forming member is formed of the hexagonal erected wall parts, and the second forming member is formed of the hexagonal erected wall parts.

Alternatively, in a molding die machining electrode according to the present invention having m (m is an integer of 2 or more) forming members for fabricating a molding die that molds a molded body with a substantially circular outer circumference by extruding a molding material through slit grooves, the molding die machining electrode includes the (n−1)-th (n is an arbitrary integer satisfying the relation 2≦n≦m) forming member having polygonal erected wall parts formed to have a substantially circular outer circumference for machining the slit grooves; and the n-th forming member formed coaxially with the (n−1)-th forming member and having polygonal erected wall parts with a substantially circular outer circumference for machining the slit grooves and a substantially circular inner circumference overlapping with the slit grooves machined with the outer circumference of the erected wall parts of the (n−1)-th forming member.

By such a configuration, since the m forming members are radially divided, the electrode can be more easily fabricated in comparison with the fabrication of an integral electrode. Also, since overlapping portions between the m forming members are formed substantially coaxially with the molded body, when the molded body is formed with the fabricated molding die, the formed curvature of the molded body can be further suppressed in comparison with a case where the overlapping portions between a plurality of the forming members are formed in a rectangular lattice pattern or a linear shape. In addition, in the molding die machining electrode having m forming members, various forms of the molding die machining electrode described above may be adopted.

In the invention of a fabricating method of a molding die for molding a molded body with a substantially circular outer circumference by extruding a molding material through slit grooves, the fabricating method including the steps; forming supply holes on a surface of a substrate for supplying the molding material; and machining the slit grooves communicated with the supply holes on the substrate using the molding die machining electrode.

In the fabricating method of a molding die, supply holes are formed on a surface of a substrate for supplying the molding material and then, the slit grooves communicated with the supply holes are machined on the substrate using any one form of the molding die machining electrode described above. In such a manner, since a plurality of forming members of the molding die machining electrode are radially divided, the molding die can be more easily fabricated in comparison with the forming members divided into rectangular lattice patterns or the forming members linearly divided. Since the overlapping portion between the machined slit grooves are formed coaxially with the molded body, when the molded body is molded with the molding die, the formed curvature of the molded body can be further suppressed in comparison with a case where the overlapping portions between a plurality of the slit grooves are formed in a rectangular lattice pattern or a linear shape.

In the fabricating method of a molding die according to the present invention, preferably, the machining the slit grooves includes first slit grooves machining step for machining the slit grooves communicated with the supply holes on the substrate with the polygonal erected wall parts formed in the first forming member; and second slit grooves machining step for machining on the substrate the slit grooves, which are communicated with the supply holes outside the slit grooves machined with the first forming member, with the polygonal erected wall parts formed in the second forming member such that the slit grooves machined with the outer circumference of the erected wall parts of the first forming member overlap with the slit grooves to be machined with the inner circumference of the erected wall parts of the second forming member. Alternatively, the machining the slit grooves may also include second slit grooves machining step for machining the slit grooves communicated with the supply holes on the substrate with the polygonal erected wall parts formed in the second forming member; and first slit grooves machining step for machining on the substrate the slit grooves, which are communicated with the supply holes inside the slit grooves machined with the second forming member, with the polygonal erected wall parts formed in the first forming member such that the slit grooves machined with the inner circumference of the erected wall parts of the second forming member overlap with the slit grooves to be machined with the outer circumference of the erected wall parts of the first forming member.

The fabricating method of a molding die according to the present invention may further include the steps of machining the circumference of the substrate at a predetermined depth from the surface of the substrate and within a range of the slit grooves machined with the second forming member after the slit grooves are machined along the outermost circumference of the substrate at the machining the slit grooves step; and removing foreign materials generated in the slit grooves at the machining the circumference step using the second forming member. The "machining the circumference" herein may include cutting, electric discharge machining, electromechanical machining, laser machining, and drilling.

Alternatively, in a fabricating method of a molding die according to the present invention for molding a molded body having a substantially circular outer circumference by extruding a molding material through slit grooves, the fabricating method includes the steps of forming supply holes on a surface of a substrate for supplying the molding material; and machining the slit grooves communicated with the supply holes on the substrate using the molding die machining electrode having the m forming members. By such a manner, since the m forming members of the molding die machining electrode are radially divided, the molding die can also be easily fabricated in comparison with the forming members divided into rectangular lattice patterns or linear shapes. The overlapping portions of the fabricated slit grooves are formed substantially coaxially with the molded body, so that when the molded body is formed with the molding die, the formed curvature of the molded body can be further suppressed in comparison with a case where the overlapping portions between a plurality of the slit grooves are formed in a rectangular lattice pattern or a linear shape. In addition, in the fabricating method of a molding die using the molding die machining electrode having the m forming members, various forms of the fabricating method of a molding die described above may be adopted.

A molding die according to the present invention is fabricated by any one of the methods described above. Since the molding die according to the present invention is fabricated with any one of the molding die machining electrodes described above, the molding die is more easily fabricated as well as the formed curvature can be further suppressed.

BRIEF DESCRIPTION OF THE DRAWINGS

FIGS. 1A to 1C are schematic structural views of a molding die machining electrode 10, in which FIG. 1A is an explanatory view of a first electrode 20, FIG. 1B a second electrode 30, and FIG. 1C a third electrode 40;

FIGS. 2A to 2D are explanatory views of processes machining supply holes 52 and a slit groove part 54 on a substrate 51, in which FIG. 2A is an explanatory view of a process machining the supply holes, FIG. 2B a first process machining slit grooves, FIG. 2C a second process machining slit grooves, and FIG. 2D a third process machining slit grooves;

FIGS. 3A to 3D are explanatory views of processes cutting and electric discharge machining a circumferential part 58 of the substrate 51, in which FIG. 3A is a sectional view of the substrate 51 after the third process machining slit grooves, FIG. 3B is an explanatory view of a process machining the circumferential part, FIG. 3C a process removing foreign materials, and FIG. 3D the molding die 50.

DETAILED DESCRIPTION OF THE INVENTION

Figure 4:
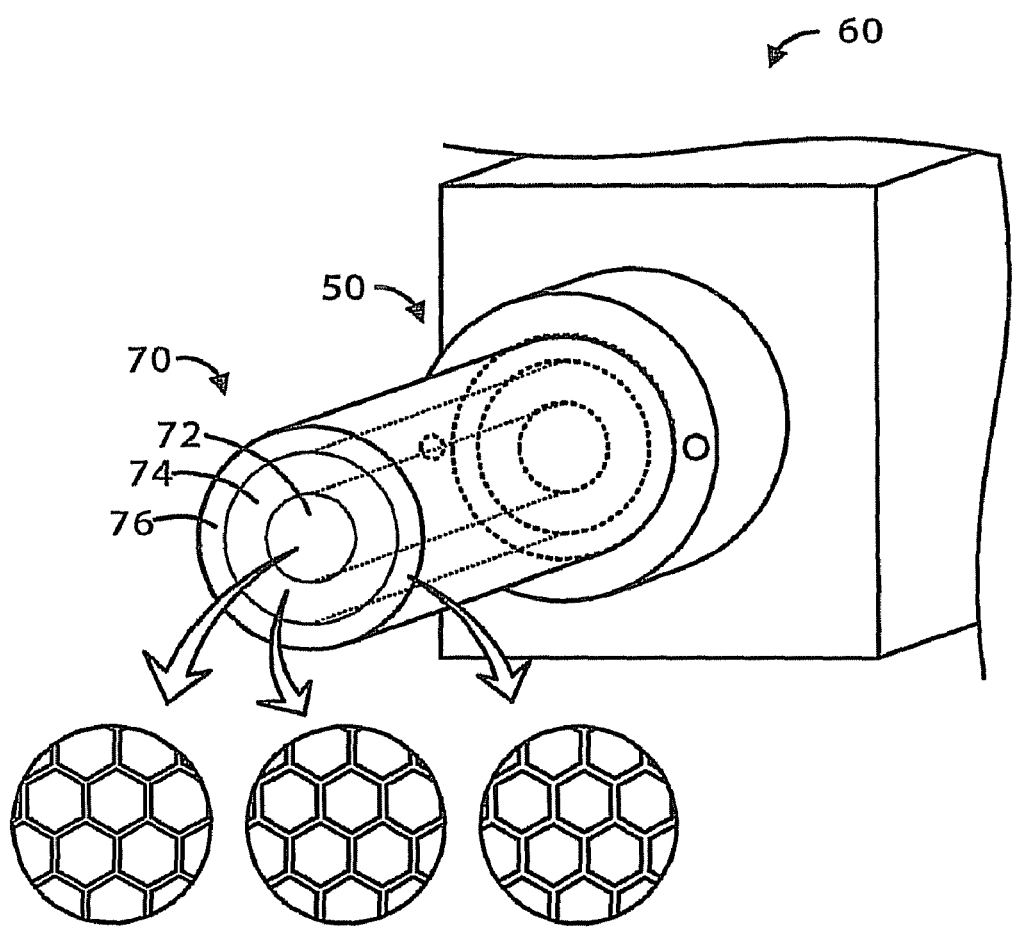
FIG. 4 is an explanatory view of extrusion forming.

Then, most preferred embodiments according to the present invention will be described with reference to the drawings. FIGS. 1A to 1C are schematic structural views of a molding die machining electrode 10 according to an embodiment, in which FIG. 1A is an explanatory view of a first electrode 20, FIG. 1B a second electrode 30, and FIG. 1C a third electrode 40. In FIGS. 1A to 1C, each upper figure is a plan view; each middle figure a partial enlarged view; and each lower figure a sectional view. The molding die machining electrode 10, as shown in FIGS. 1A to 1C, includes three electrode members of the first electrode 20, the second electrode 30, and the third electrode 40 for electric discharge machining a molding die electrode for use in extrusion molding a honeycomb carrier for cleaning up vehicle exhaust gas and a honeycomb filter removing fine particles. The number of electrode members in the molding die machining electrode 10 is not limited to a specific one as long as the number is two or more.

The first electrode 20, as shown in FIG. 1A, is a member for machining slit grooves at substantially the center of a substrate of the molding die, and made of a member for electric discharge machining (graphite, copper/tungsten, and copper, for example). The first electrode 20 includes a rectangular plate base 21 and a slit groove forming part 22 erected from the center of the base 21 for forming slit grooves on the substrate of the molding die. The slit groove forming part 22 is formed of polygonal erected wall parts 23 arranged in a row to have a substantially circular circumference. A hexagon is employed by the polygon of the erected wall part 23 having a space 24 with a hexagonal inside perimeter at its center. The erected wall part 23 has a thickness of d1 based on the wall thickness of the molded body molded using the molding die machined by the molding die machining electrode 10.

The second electrode 30 is a member for machining slit grooves around the slit grooves formed with the first electrode 20 on the substrate of the molding die, and made of a member for the electric discharge machining (graphite, copper/tungsten, and copper, for example). The second electrode 30 includes a rectangular plate base 31 and a slit groove forming part 32 erected cylindrically about the center of the base 31 and forms slit grooves on the substrate of molding die. The slit groove forming part 32 is formed of polygonal erected wall parts 33 arranged in rows about the same axis as that of the first electrode 20 to have a substantially circular shape with its inside circumference overlapping with the outside circumference of the slit grooves formed with the outer circumference of the erected wall parts 23 in the first electrode 20 as well as the slit groove forming part 32 has a substantially outer circular circumference by arranging the polygonal erected wall parts 33. Namely, the erected wall parts 33 are formed such that during machining the molding die, the slit grooves machined with the erected walls 23 in the outer circumference of the first electrode 20 overlap with the slit grooves machined with the erected wall parts 33 in the inner circumference of the second electrode 30. The erected wall part 33 is shaped in a hexagon and has a space 34 with a hexagonal inside perimeter at its center. The erected wall part 33 also has a thickness of d2, larger than d1, based on the wall thickness of the molded body molded using the molding die machined by the molding die machining electrode 10. The second electrode 30 is provided with a through part 35, which is a circular through-hole, formed at the center.

The third electrode 40 is a member for machining slit grooves around the slit grooves formed with the second electrode 30 on the substrate of the molding die, and made of a member for the electric discharge machining (graphite, copper/tungsten, and copper, for example). The third electrode 40 includes a rectangular plate base 41 and a slit groove forming part 42 erected cylindrically about the center of the base 41 and forms slit grooves on the substrate of the molding die. The slit groove forming part 42 is formed of polygonal erected wall parts 43 arranged in rows about the same axis as those of the first electrode 20 and the second electrode 30 to have a substantially circular shape with its inside circumference overlapping with the outside circumference of the slit grooves formed with outer circumferences of the erected wall parts 33 in the second electrode 30 as well as the slit groove forming part 42 has a substantially circular outer circumference by arranging the polygonal erected wall parts 43. Namely, the erected wall parts 43 are formed such that during machining the molding die, the slit grooves machined with the erected wall parts 33 in the outer circumference of the second electrode 30 overlap with the slit grooves machined with the erected wall parts 43 in the inner circumference of the third electrode 40. The erected wall part 43 is shaped in a hexagon and has a space 44 with a hexagonal inside perimeter at its center. The erected wall part 43 has a thickness of d3, larger than d2, based on the wall thickness of the molded body molded using the molding die machined by the molding die machining electrode 10. The erected wall parts 43 are also formed to have a diameter one-size larger than that for forming the molded body with the molding die. The third electrode 40 is provided with a through part 45, which is a circular through-hole, formed at the center.

In the molding die machining electrode 10, the slit groove forming parts 22, 32, and 42 are formed such that the slit groove forming parts 22, 32, and 42 of the first to third electrodes 20, 30, and 40 have respective nearer areas. It is more preferable that the slit groove forming parts 22, 32, and 42 have the same area; however, if the respective areas are not equalized due to the total area of the molding die 50, the respective polygon areas of the erected wall parts 23, 33, and 43, and the thicknesses d1, d2, and d3, it is preferable that the respective areas be designed closer to each other.

Then, the operation for machining the molding die 50 with the molding die machining electrode 10 configured in such a manner will be described. The fabrication of the molding die 50 includes: (1) a supply hole machining process for perforating the substrate to have supply holes for supplying a forming material therethrough; (2) a slit groove machining process for machining slit grooves communicating with the supply holes with the molding die machining electrode 10; (3) a circumference machining process for cutting or electric discharge machining a circumferential part of the substrate at a predetermined depth and within a range of the slit grooves fabricated along the outermost circumference; and (4) a foreign material removing process for removing foreign materials generated by the circumference machining process in the slit grooves. FIGS. 2A to 2D are explanatory views of processes machining supply holes 52 and a slit groove part 54 on a substrate 51, in which FIG. 2A is an explanatory view of a process machining the supply holes, FIG. 2B a first process machining slit grooves, FIG. 2C a second process machining slit grooves, and FIG. 2D a third process machining slit grooves. FIGS. 3A to 3D are explanatory views of processes cutting and electric discharge machining a circumferential part 58 of the substrate 51, in which FIG. 3A is a sectional view of the substrate 51 after the third process machining slit grooves, FIG. 3B is an explanatory view of a process machining the circumferential part, FIG. 3C a process removing foreign materials, and FIG. 3D the molding die 50. In FIGS. 2A to 2D, each upper figure is a sectional view of each electrode; each middle figure a plan view of the substrate 51; and each lower figure a partial enlarged view of the substrate 51.

(1) Supply Hole Machining Process

The substrate 51 is prepared as a base of the molding die. A disk or a sectoral plate with a diameter one size larger than that of the molding die (stainless steal or cemented carbide) is used. As shown in FIG. 2A, the upper surface of the substrate 51 is perforated with liquid holes 52a for forming slit grooves while the bottom surface of the substrate 51 being perforated with supply holes 52, each larger than the liquid hole 52a, formed on a supply hole forming region 51a. The perforation with the liquid holes 52a and the supply holes 52 may be executed by electromechanical machining, electric discharge machining, laser machining, or drilling, for example. The liquid holes 52a and the supply holes 52 are formed at positions where they communicate with the slit grooves that will be formed later, herein, at three points among apexes of each hexagon of the slit grooves. The substrate 51 is also perforated with fixing holes 53 that are through-holes formed at ends of the substrate 51 for fixing the substrate 51 with bolts.

(2) Slit Groove Machining Process

Then, using an electric discharge machine (not shown), a slit groove part 54 is formed with the molding die machining electrode 10 on the upper surface of the substrate 51 where the liquid holes 52a are formed. The slit groove machining process herein includes first slit groove machining with the first electrode 20, second slit groove machining with the second electrode 30, and third slit groove machining with the third electrode 40 to be executed sequentially in that order. In the electric discharge machining, a voltage with a predetermined pulse is applied across between the substrate 51 and the slit groove forming parts 22, 32, and 42 serving as machining electrodes so as to generate sparks between them for machining the surface of the substrate 51. The electric discharge machining herein has three sets of rough processing, depth finishing, and width finishing that are executed using the electrodes 20, 30, and 40, respectively; alternatively, the slit groove part 54 may also be finished with one set of the electrode or with two or more optional sets of the electrodes. First, while the substrate 51 is being fixed with its upper surface directed upward to the electric discharge machine, the first electrode 20, with its slit groove forming part 22 directed downwardly, is fixed on the substrate 51 for machining a first slit groove part 54a of the substrate 51. When electric discharge machining using the first electrode 20, as shown in the lower figure of FIG. 2B, first slit grooves 55 communicated with the supply holes 52 are formed with the erected wall parts 23 (see FIG. 1A). Then, as shown FIG. 2C, the electric discharge machining is executed using the second electrode 30. In the second slit groove machining process, while the second electrode 30 is arranged coaxially with the first electrode 20, the electric discharge machining is executed by fixing the second electrode 30 such that the first slit grooves 55 machined with the erected wall parts 23 in the outer circumference of the first electrode 20 overlap with second slit grooves 56 to be machined with the erected wall parts 33 in the inner circumference of the second electrode 30. Since the thickness d2 of the erected wall part 33 is larger than the thickness d1 of the erected wall part 23, the second electrode 30 is arranged such that the first slit grooves 55 are included in the second slit grooves 56. When electric discharge machining in such a manner, as shown in the lower figure of FIG. 2C, the second slit grooves 56 communicated with the supply holes 52 are formed with the erected wall parts 33 (see FIG. 1B). Subsequently, as shown in FIG. 2D, the electric discharge machining is executed using the third electrode 40. In the third slit groove machining process, while the third electrode 40 is arranged coaxially with the first electrode 20 and the second electrode 30, the electric discharge machining is executed by fixing the third electrode 40 such that the second slit grooves 56 machined with the erected wall parts 33 in the outer circumference of the second electrode 30 overlap with third slit grooves 57 to be machined with the erected wall parts 43 in the inner circumference of the third electrode 40. Since the thickness d3 of the erected wall part 43 is larger than the thickness d2 of the erected wall part 33, the third electrode 40 is arranged such that the second slit grooves 56 are included in the third slit grooves 57. When electric discharge machining in such a manner, as shown in the lower figure of FIG. 2D, the third slit grooves 57 communicated with the supply holes 52 are formed with the erected wall parts 43 (see FIG. 1C). By the slit groove machining process in such a manner, overlapping portions of the slit groove part 54 are formed substantially coaxially in the same way of a molded body 70 while the slit groove part 54 is formed such that the width of the slit groove is increased with increasing circumference. The case of the three electrodes has been described herein; when the number of the electrodes is four or more, the processing described above may be repeated.

(3) Circumference Machining Process

Then, as shown in FIGS. 3A and 3B, for arranging the molding die in shape at its outer circumferential end, a circumferential part 58, which is a range including a part slit at a predetermined depth from the surface of the substrate 51, of the substrate 51 is subjected to a circumference machining process with cutting or electric discharge machining. The circumference machining process may be executed prior to the slit groove machining process; however, since the end of a third slit groove part 54c becomes different in height, so that the third slit grooves 57 have the difference in depth due to the difference in wear of the erected wall part 43, the circumference machining process herein is executed after the slit groove machining process. When the circumferential part 58 is machined by the circumference machining process, it may be executed by electromechanical machining, electric discharge machining, laser machining, or drilling.

(4) Foreign Material Removing Process

Subsequently, as shown in FIG. 3C, foreign materials (burrs, for example) generated in the third slit groove part 54c by the circumference machining process are removed. The removing of the foreign materials is executed on the third slit groove part 54c, which is the circumferential part 58 machined by cutting or electric discharge machining, by the third slit groove machining process using the slit groove forming part 42 of the third electrode 40. If the slit groove herein is machined using a rectangular electrode for example, while the circumferential part 58, which is cut or electric discharge machined, is circular, the electrode is rectangular to have a different shape, so that it is necessary to remove the foreign materials at several times using the electrode. The third electrode 40 and the circumferential part 58 herein have the same shape that is radially divided, so that even when the circumferential part 58 has been cut or electric discharge machined, the removing of the foreign materials can be once executed by the slit groove machining process using the third electrode 40. Through such steps, the molding die 50 shown in FIG. 3D can be machined.

Then, as shown in FIG. 4, while a disk-shaped fixed plate (not shown) is being set at the circumferential part 58, the molding die 50 is fixed at the end of an extruder 60; a forming material is supplied to the extruder 60 via its supply holes 52 for extrusion forming by pressurizing the forming material. FIG. 4 is an explanatory view of the extrusion forming. In such a manner, the extrusion forming is executed using the molding die 50 machined with the erected wall parts 23, each having a thickness of d1 of the molding die machining electrode 10, the erected wall parts 33, each having a thickness of d2, and the erected wall parts 43, each having a thickness of d3, so that a molded body 70 can be molded having a first region 72, a second region 74, and a third region 76, i.e., having wall thicknesses increasing with increasing circumference. Then, through a drying process, a burning process, and a catalyst carrying process, the molded body 70 is used for a honeycombed structure.

According to the molding die machining electrode 10 of the embodiment described in detail as above, while the first slit grooves 55 are formed with the slit groove forming part 22 formed of the hexagonal erected wall parts 23 arranged in a row to have a substantially circular outer circumference, the slit grooves on the outside of the first slit groove part 54a formed with the first electrode 20 are machined with the slit groove forming part 32 arranged coaxially with the slit groove forming part 22, which is formed of the hexagonal erected wall parts 33 to have a substantially circular inner circumference and to overlap with the erected wall parts 23 on the outer circumference of the slit groove forming part 22 as well as to have a substantially outer circular circumference. Similarly, the slit grooves on the outside of a second slit groove part 54b formed with the second electrode 30 are machined with the erected wall parts 43 of the third electrode 40. Since a plurality of slit groove forming parts are radially divided in such a manner, the molding die machining electrode 10 can be more easily fabricated in comparison with the fabrication of an integral molding die machining electrode. The overlapping portions between a plurality of the slit groove forming parts are formed substantially coaxially with the molded body, so that when the molded body is formed with the fabricated molding die 50, the formed curvature of the molded body can be further suppressed in comparison with a case where the overlapping portions between a plurality of the slit groove forming parts are formed in a rectangular lattice pattern or a linear shape. Since the hexagonal erected wall parts 23, 33, and 43 are arranged in rows, their outer or inner circumferences are substantially circular, so that imperfect polygons do not exist in the outer or inner circumference of each slit groove forming part, suppressing the misalignment in slit grooves formed by the slit groove forming parts. Since the first to third electrodes 20 to 40 are configured such that the slit groove forming parts 22, 32, and 42 have respective areas closer to each other, the unevenness in wear of the erected wall parts 23, 33, and 43 of the slit groove forming parts 22, 32, and 42 can be more suppressed, so that during fabrication of the molding die 50, accuracies in size in the depth direction can be improved and variations in slit width can be also reduced. Since the areas are constant, variations in fabrication time can be suppressed, so that the time for electrode fabrication, i.e., slit machining, becomes constant, improving the productivity. Furthermore, since the thickness of the erected wall part is increased with increasing circumference, in the order of the erected wall parts 23, 33, and 43, the strength of the formed molded body 70 can be increased, facilitating the molded body 70 to be fabricated. Since the first to third electrodes 20 to 40 are also configured such that the hexagonal erected wall parts 23, 33, and 43 are arranged in rows, respectively, the mechanical strength of the molded body 70 formed with the fabricated molding die 50 can be increased when an external force is applied thereto.

According to the fabrication method of the molding die 50, since a plurality of the slit groove forming parts of the molding die machining electrode 10 are radially divided, the molding die 50 can be more easily fabricated in comparison with slit groove forming parts divided into rectangular lattice patterns or linear shapes. The overlapping portions of the fabricated slit groove part 54 are formed substantially coaxially with the molded body 70, so that when the molded body 70 is formed with the molding die 50, the formed curvature of the molded body can be further suppressed in comparison with a case where the overlapping portions between a plurality of the slit groove are formed in a rectangular lattice pattern or a linear shape. Since the slit groove part 54 is formed from the inner circumference toward the outer circumference in the order of the first to third electrodes 20 to 40, the slit groove machining process can be executed more easily. Furthermore, since the removal of foreign materials generated by the circumferential machining process may be performed with the third electrode 40 having the same shape as that of the circumferentially machined body, the number of removing operations with the slit groove forming part in the foreign material removing process can be reduced in comparison with a case using a molding die machining electrode divided into rectangular lattice patterns or linear shapes. Also, the molded body 70 formed with the molding die 50 fabricated in such a manner is molded using the molding die 50 machined with the molding die machining electrode 10 described above, facilitating the molded body 70 to be fabricated as well as suppressing formed curvature.

The correspondence relationship between the components according to the embodiment and those according to the present invention is explained herein. The slit groove forming part 22 according to the embodiment corresponds to a first forming member, and the slit groove forming part 32 corresponds to a second forming member. If the slit groove forming part 32 corresponds to a first forming member, the slit groove forming part 42 corresponds to a second forming member.

The present invention is not limited to the embodiment described above, so that various modifications can be obviously made within the technical scope of the invention.

For example, according to the embodiment described above, the slit groove forming parts 22, 32, and 42 are formed such that the respective areas of the erected wall parts 23, 33, and 43 are close to each other; however, the invention is not limited to this, so that the areas may not be close to each other. Even in such a manner, the molding die machining electrode 10 and the molding die 50 can be easily fabricated while the formed curvature of the molded body 70 can be suppressed when the molded body 70 is molded with the molding die 50.

According to the embodiment described above, the respective thicknesses of the erected wall parts 23, 33, and 43 are increased toward the outer circumference in that order; however, the thicknesses of the erected wall parts 23, 33, and 43 may be the same. Alternatively, the thicknesses of the erected wall parts 23, 33, and 43 may be decreased toward the outer circumference in that order; and the respective thicknesses may be designed as having appropriately arbitrary values. They may be appropriately designed in accordance with characteristics and performances of the molded body 70.

According to the embodiment described above, the slit groove part 54 is formed from the inner circumference toward the outer circumference in the order of the first electrode 20, the second electrode 30, and the third electrode 40; however, the invention is not limited to this, so that the slit groove part 54 may also be formed from the outer circumference toward the inner circumference in the order of the third electrode 40, the second electrode 30, and the first electrode 20; and the slit groove part 54 may also be formed in a random order. Even in such a manner, the molding die machining electrode 10 and the molding die 50 can be easily fabricated while the formed curvature of the molded body 70 can be suppressed when the molded body 70 is molded with the molding die 50.

According to the embodiment described above, in the slit groove forming parts 22, 32, and 42, by arranging the hexagonal erected wall parts 23, 33, and 43 in rows, the outer and inner circumferences of the erected wall parts are formed in substantially circular shapes; however, the invention is not specifically limited to this, so that part or the entire of the hexagonal erected wall parts 23, 33, and 43 may not be arranged and the outer and inner circumferences of the erected wall parts may also be formed in substantially circular shapes. Namely, an imperfect hexagon (one or more sides with one not-connected end exist) may be formed in the outer and inner circumferences of the slit groove forming parts 22, 32, and 42. Even in such a manner, the molding die machining electrode 10 and the molding die 50 can be easily fabricated while the formed curvature of the molded body 70 can be suppressed when the molded body 70 is molded with the molding die 50.

According to the embodiment described above, the circumference machining process and the removal of foreign materials process are executed after the slit groove machining process; alternatively, they may be executed prior to the slit groove machining process or the circumference machining process and the removal of foreign materials process may also be omitted.

According to the embodiment described above, the erected wall parts 23, 33, and 43 are arranged in hexagonal shapes; the invention is not limited to this as long as they are polygonal, so that a triangle, a square, an octagon, and a dodecagon may be adopted. At this time, the polygonal wall parts may be arranged so that contours of the slit groove forming parts 22, 32, and 42 become circular as closely to the contour shape of the molded body 70 as possible.

The present application claims priority from Japanese Patent Application No. 2007-244063 filed on Sep. 20, 2007, the contents of which including the specification, the drawings, and the claims disclosed therein are hereby fully incorporated by reference into this application.

What is claimed is:

1. A set of molding die machining electrodes for fabricating a molding die that molds a molded body with a substantially circular outer circumference by extruding a molding material through slit grooves, the set of molding die machining electrodes comprising:
   a first machining electrode having polygonal erected wall parts with for machining the slit grooves, the first machining electrode having a substantially circular outer circumference; and
   a second machining electrode having polygonal erected wall parts for machining the slit grooves, the second machining electrode having a substantially circular outer circumference and a substantially circular inner circumference, the dimension of which overlaps the dimension of the outer circumference of the first machining electrode.

2. The set of molding die machining electrodes according to claim 1, wherein the first machining electrode is formed to have a substantially circular outer circumference by arranging the polygonal erected wall parts in a contiguous pattern, and by the second machining electrode is formed to have substantially circular inner and outer circumferences by arranging the polygonal erected wall parts in a contiguous pattern.

3. The set of molding die machining electrodes according to claim 1, wherein the first machining electrode and the second machining electrode are formed such that the total area of the end faces of the erected wall parts of the first machining electrode is about the same as the total area of the end faces of the erected wall parts of the second machining electrode.

4. The set of molding die machining electrodes according to claim 1, wherein the thickness of the polygonal erected wall parts of the second machining electrode is different from the thickness of the erected wall parts of the first machining electrode.

5. The set of molding die machining electrodes according to claim 4, wherein the thickness of the polygonal erected wall parts of the second machining electrode is larger than the thickness of the erected wall parts of the first machining electrode.

6. The set of molding die machining electrodes according to claim 1, wherein the first machining electrode is formed of hexagonal erected wall parts, and the second machining electrode is formed of hexagonal erected wall parts.

* * * * *

UNITED STATES PATENT AND TRADEMARK OFFICE
CERTIFICATE OF CORRECTION

PATENT NO. : 8,178,815 B2
APPLICATION NO. : 12/233843
DATED : May 15, 2012
INVENTOR(S) : Kazumasa Kitamura and Tomoki Nagae It is certified that error appears in the above-identified patent and that said Letters Patent is hereby corrected as shown below:

Column 9

Line 29: please delete "as" before "above"

Column 12

Line 13: please delete "with"

Line 27: please delete "by"

Signed and Sealed this
Thirty-first Day of July, 2012

David J. Kappos
Director of the United States Patent and Trademark Office